June 3, 1969  B. D. STANTON  3,448,382

FREQUENCY MULTIPLYING OR DIVIDING CIRCUIT

Filed May 11, 1966

INVENTOR:
B. D. STANTON
BY Theodore E. Bieber
HIS ATTORNEY

United States Patent Office

3,448,382
Patented June 3, 1969

---

3,448,382
FREQUENCY MULTIPLYING OR DIVIDING CIRCUIT
Benjamin D. Stanton, Walnut Creek, Calif., assignor to Shell Oil Company, New York, N.Y., a corporation of Delaware
Filed May 11, 1966, Ser. No. 549,336
Int. Cl. G01r 23/02
U.S. Cl. 324—78          7 Claims

---

ABSTRACT OF THE DISCLOSURE

A circuit for multiplying or dividing a reference frequency by any real number using a capacitance bridge having capacitors that are discharged in opposition to each other, one of the capacitors being charged and discharged at a reference frequency, while the other capacitor is charged and discharged at the desired multiple or fraction of the reference frequency.

---

Figure 1:
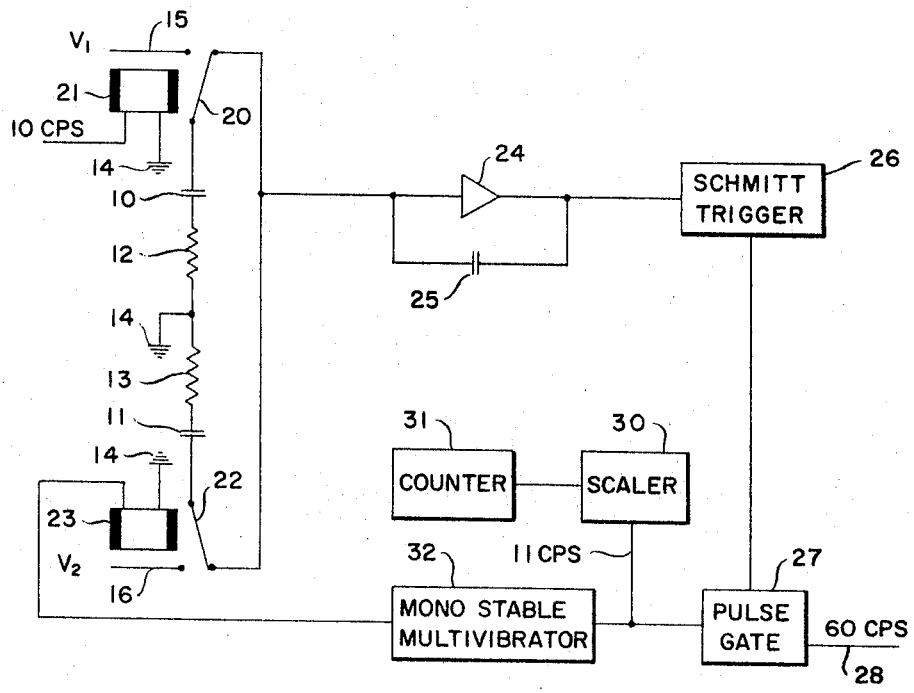

This invention pertains to frequency multiplying and dividing circuits and more particularly to circuits that will multiply or divide a frequency by any real number.

While many frequency multiplying and dividing circuits are known, they are capable of supplying only harmonics of the given frequency. These circuits will supply a signal which is any given multiple or any given part of the known frequency. In addition, most of these circuits are limited to multiplying or dividing but are not capable of performing both functions. In many industrial applications it is necessary to divide a given frequency or multiply it by a given real number when both the frequency and the multiplicand are variables. For example, most flowmeters used in industrial processes supply an output signal whose freqency is related to the rate of flow. In order to convert the signal to known units of measure, for example, gallons or barrels, it is necessary to divide or multiply the meter frequency by a set number and integrate. For example, 8.759 pulses may equal one gallon of fluid. Thus, it is necessary to divide the meter frequency by 8.759 to obtain an output flow rate signal in gallons/time. Obviously, the number 8.759 is not a harmonic of the signal supplied by the flowmeter.

In some instances, instead of dividing the flowmeter signal to obtain the output in gallons or barrels, it is necessary to multiply the flowmeter signal by a particular number. For example, it may be necessary to multiply the frequency of the flowmeter signal by 1.29 to obtain an output in gallons. Again, it is apparent that the flowmeter signal cannot be multiplied by known frequency multiplying circuits if the multiplification must be by the factor of 1.29.

In addition to the above problems of multiplying and dividing a frequency by a real number, it is sometimes necessary to correct the frequency for other factors. For example, in the case of a flowmeter measuring a fluid flow it is sometimes necessary to correct the reading for changes in temperature of the fluid. Also, in the case of petroleum products transfer of custody from one owner to the next is made on the basis of the quantity corrected to a fixed reference temperature. Thus if the flowmeter is measuring the product at 70 degrees and the transfer is to be at 60 degrees, a correction must be applied to obtain an accurate measurement of the amount of product transferred at the reference temperature. Thus the problem is presented of converting the frequency of the flowmeter signal to known units of measure and at the same time correcting the flowmeter reading for variations in temperature of the product.

The present invention solves these problems by providing a capacitor bridge circuit having two capacitors that are charged and discharged in opposition to each other. The capacitors are discharged to an operational amplifier that is provided with a capacitor in its feedback circuit. Thus the amplifier operates as an integrating circuit to provide the time integral of the difference between the charges on the two capacitors. One of the capacitors is charged from a voltage that represents the temperature correction or other variable and is charged and discharged at a rate related to the frequency of the flowmeter. The second capacitor is charged from a reference voltage which is set for the scaling factor between the meter frequency and the desired readout units. The frequency of charging and discharging the second capacitor is controlled in response to the readout circuit. Thus the frequency of charging the second capacitor is related to the meter frequency times the scaling factor times the temperature correction.

The above circuit electrically responds to the formula:

$$V_1 C_1 f_1 = V_2 C_2 f_2$$

From an inspection of this formula, it can be seen that if the capacitors $C_1$ and $C_2$ are equal and the voltage $V_2$ set at the scaling factor, then the frequency $f_2$ will vary in response to the frequency $f_1$ and the voltage $V_1$. Thus if the voltage $V_2$ is adjusted for the scaling factor between $f_1$ and $f_2$ the circuit will effectively multiply or divide the meter frequency in response to the scaling factor. In addition, the crossover between multiplying and dividing will be smooth and can be accomplished by adjusting the factors in the above equation.

Figure 2:
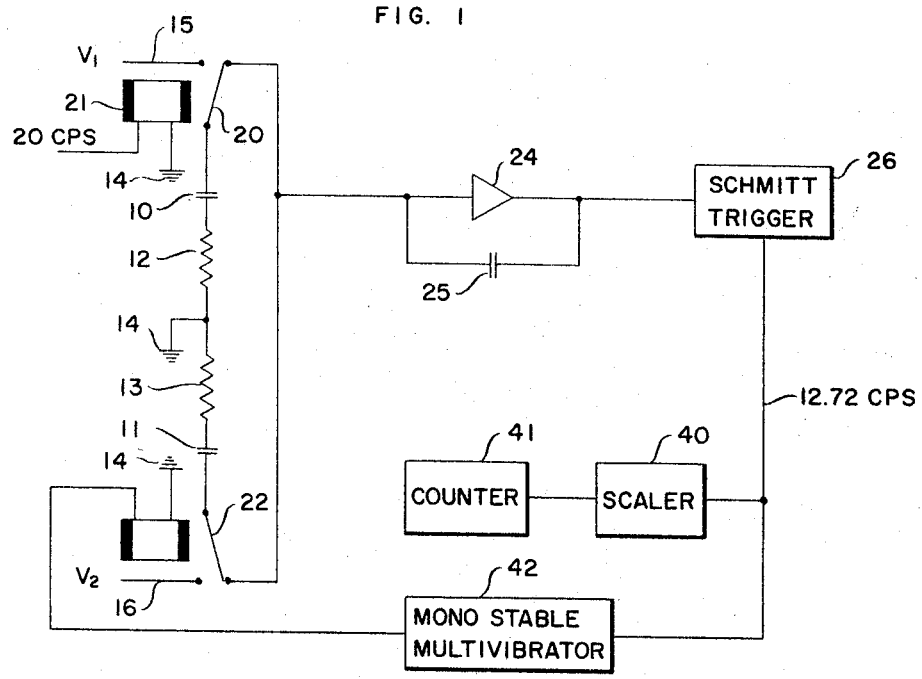

The above advantages of this invention and its operation will be more easily understood from the following detailed description of the preferred embodiments when taken in conjunction with the attached drawing in which:

FIGURE 1 is a block diagram of an embodiment of this invention suitable for multiplying an input frequency by a fixed real number; and FIGURE 2 is a block diagram drawing of a second embodiment of this invention suitable for dividing an input frequency by a fixed number.

Referring now to FIGURE 1, there is shown a capacitor bridge circuit formed by two capacitors 10 and 11 that are coupled in electrical opposition through resistances 12 and 13 to a ground 14. Normally, the capacitors 10 and 11 have different values and the relationship between the two depends on whether the circuit is primarily a multiplying or dividing circuit. For example, in the case of a dividing circuit capacitor 10 is normally of a small value and capacitor 11 of a large value. The exact values of the two capacitors will depend upon the magnitude of the division. Of course, for a circuit that is intended primarily as a multiplying circuit capacitor 10 is large compared to capacitor 11. The capacitor 10 is charged from a voltage source illustrated by a contact 15. This voltage source will normally be varied in response to the variations in the independent variable for which it is desired to correct the output reading. In the example given above the voltage source would be varied in response to the temperature of the material flowing through the flowmeter. Any independent variable whose magnitude can be represented by an analog voltage can be used to supply the voltage 15.

The capacitor 10 is discharged into the operational amplifier 24. The amplifier 24 is provided with a capacitor 25 at its feedback circuit in order that it may operate as an integrating device to supply the time integral of the difference between the charges on the capacitors 10 and 11. The capacitor 10 is alternately connected to the charging voltage 15 and the amplifier 24 through a switch means 20. The switch means 20 is operated by a relay coil 21 that is responsive to the signal generated by the flowmeter. Thus the switch means 20 will operate at a frequency related to the signal from the flowmeter.

The second capacitor 11 is charged from a voltage source represented by the contact 16 and discharged in electrical opposition to the capacitor 10 to the operational amplifier 24. The voltage source 16 is a variable voltage source that is adjusted to reflect the scaling factor between the meter frequency and the output frequency of the circuit. In the example shown in FIGURE 1, this scaling factor is assumed to be 1:1. Thus a ten-cycle per second signal of the relay 21 will result in an eleven-cycle per second signal from the circuit. The capacitor 11 is alternately coupled to the charging and discharging circuit by a switch means 22 and relay coil 23 that is energized by the output frequency of the circuit.

The amplifier 24 is coupled to a Schmitt trigger circuit 26 that is adjusted to change from its non-conducting to conducting state whenever the voltage level of the signal from the amplifier 24 reaches a preset level. The Schmitt trigger circuit 26 is designed to trigger or change its state of conduction when the input signal from amplifier 24 reaches a preset voltage, say −3.5 volts. The Schmitt trigger circuit 26 is coupled to a pulse gate 27 with the pulse gate being supplied with a source of fixed frequency voltage or a reference voltage. As shown in FIGURE 1, the reference voltage may be commercial 60 cycle power. The pulse gate 27 is designed to open when it receives a signal from the Schmitt trigger circuit 26 and remain open as long as the signal from the trigger circuit exists. Thus the pulse gate 27 will transmit cycles of the reference signal 28 back to the feedback relay 23. The pulse gate 27 will supply these pulses each time the Schmitt trigger circuit is actuated.

The signal from the pulse gate is supplied both to a monostable mulitvibrator 32 and to a counting circuit. The counting circuit consists of a fixed count scaler 30 and a counter 31. The signals from the pulse gate actuate scaler 30 and the counter then counts the number of pulses passed by the gate. As will be explained below, the frequency of the signals from the pulse gate is equal to the frequency of the input signal times a scaling factor. Thus the counter 31 will provide a measurement of the fluid flow in the proper units.

The multivibrator 32 is used to operate the switch means 22 through the relay coil 23. More particularly, the multivibrator 32 has a stable state and an unstable state. Each pulse from the pulse gate 27 triggers the multivibrator to its unstable state and causes it to operate the switch means 22 through the relay 23. The multivibrator then returns to its stable state, in which condition the relay coil 23 is de-energized. When the relay coil 23 is de-energized the switch means 22 should normally be closed against the voltage source 16. This insures that the capacitor 11 will have time to fully charge before the multivibrator again energizes the relay coil 23 to discharge the capacitor through the amplifier 24.

The operation of the above-described circuit can be more easily understood by referring again to the formula set forth above as follows:

$$V_1 C_1 f_1 = V_2 C_2 f_2$$

In this formula, as explained, the two capacitors have unequal values with capacitor 10 being large and capacitor 11 small. Thus the frequency $f_1$ times the voltage $V_1$ times $C_1$ will have to equal the frequency $f_2$ times the voltage $V_2$ times $C_2$. If one assumes that the frequency $f_1$ represents the input frequency and the voltage $V_2$ represents the scaling factor, it can be seen that by adjusting $V_2$ the frequency $f_2$ can be made to be a multiple of the frequency $f_1$ or a fraction of the frequency $f_1$. In the above circuit the difference in the charges on the two capacitors is used to operate a Schmitt trigger circuit 26, which in turn through the pulse gate 27 generates a new frequency from the reference frequency source 28. This frequency in turn is used to operate the switch means 22 which controls the rate at which the capacitor 11 is charged and discharged. As the input frequency $f_1$ varies the magnitude of the charge from the capacitor 10 in FIGURE 1 will vary. This will cause the voltage signal supplied to the amplifier 24 to vary. The amplifier 24 will in turn supply an output signal equal to the time integral of the input signal. As the amplitude of the signal continues to increase, it will reach a level at which it will trigger the Schmitt trigger circuit 26. This will cause the pulse gate 27 to open and transmit a portion of the reference frequency 28. This portion of the reference frequency will cause the operation of the relay 23 to charge and discharge as the capacitor $C_2$ or 11 in FIGURE 1, thus offsetting the charge from the capacitor $C_1$ or 10. This action will continue until the charge contributed by capacitor 11 exceeds the charge from capacitor 10 to the extent required to cause the output signal of amplifier 24 to drop below the trigger level of the Schmitt trigger 26. When this happens the Schmitt trigger 26 will assume its other stable state and close the pulse gate 27. The charge from capacitor 10 will then cause the signal from the amplifier 24 to again increase until the trigger level of the Schmitt trigger 26 is reached. Again the Schmitt will trigger and transmit pulses to oprate the relay 23 to charge and discharge capacitor 11.

The instantaneous frequency of the signal from pulse gate 27 will probably not equal the desired frequency but over a finite time the frequency will equal the desired frequency. Of course, the actual output frequency will consist of a series of interrupted pulses. While the pulses are interrupted, they can be used for all control functions regardless of whether the control is analog or digital.

The dwell time of the monostable multivibrator 32 is important since it must exceed the time constant of the capacitor 11 and resistance 13. This insures that the capacitor will be completely discharged before the multivibrator returns to its stable state. It has been found that to insure good results the dwell time should be approximately eight times the time constant. The dwell time of the multivibrator of course limits the maximum input frequency that can be multiplied by the system.

If any of the input variables to the system change, the circuit in turn will adjust the frequency $f_2$ to counteract the changes. Thus if the voltage $V_1$ which is responsive to the temperature of the fluid varies, the appropriate change will take place in the circuit. It should be noted that the voltage $V_1$ or 15 can go either up or down about its set point; thus if the desired temperature is made equal to a positive voltage the circuit can compensate for temperatures that are below the desired temperature or above the desired temperature. Thus the final readout on the counter 31 will be equal to the quantity of fluid flowing through the flowmeter expressed in proper units and corrected to the standard temperature.

Referring now to FIGURE 2, there is shown a block diagram of a circuit suitable for dividing the input frequency by a scaling factor to obtain a new frequency. The bridge circuit and relay switches shown in FIGURE 2 are identical with those shown in FIGURE 1 and will not be described in detail. Likewise, the operational amplifier 24 and trigger circuit 26 are identical with those shown in FIGURE 1. The signal from the operational amplifier 24 and the trigger circuit 26 is fed to the monostable multivibrator 42 which in turn is coupled to the relay coil 23. As explained above, the multivibrator should be of the type that has one stable state of operation and an unstable state of operation. The relay coil should be operated by the unstable state of operation in order that the switch 22 will normally be closed against the voltage supply V₂ to charge the capacitor. Thus when the multivibrator is triggered to its unstable state of operation by the trigger circuit 26, it will operate the relay and discharge the capacitor. The trigger circuit 26 is also connected to a scaler 40 which in turn is connected to a counter 41. Thus the counter 41 will count the number of pulses supplied by the Schmitt trigger circuit 26 to the multivibrator.

When the circuit shown in FIGURE 2 is operated, the level of the trigger circuit 26 is set so that it is capable of supplying sufficient pulses to operate the multivibrator 42 within the effective range of operation. Whenever the output level of the amplifier 24 reaches the set level of the trigger circuit 26, the circuit 26 will operate and generate a pulse. This pulse in turn will actuate the relay coil 23, causing the capacitor 11 to discharge into the amplifier 24. As explained above, the frequency of the operation of the trigger circuit 26 will be related to the frequency times the voltage V₂. Thus the voltage V₂ is in effect the scaling factor of the circuit that can be adjusted to give any desired ratio between the input frequency to the circuit and the frequency of operation of the trigger circuit 26.

The dividing circuit operates in a similar manner to the multiplying circuit shown in FIGURE 1. The charge from the capacitor 10 causes the output signal of amplifier 24 to increase until the trigger level of the circuit 26 is reached. The Schmitt trigger 26 triggers and operates the relay 23 to discharge the capacitor 11. The discharge of the capacitor 11 decreases the output signal of the amplifier 24 below the trigger level of Schmitt circuit 26 and causes the Schmitt circuit to assume its other stable state.

As pointed out above, the capacitor 11 is larger than capacitor 10 in a dividing circuit. Thus each charge from the capacitor 11 will be equal to several charges from the capacitor 10. The exact relationship between the value of the two capacitors will depend upon the desired range of the circuit and the scaling factor. The proper choice of values can be made by those skilled in the art once the desired parameters are set. For example, the following values have been found satisfactory for a variation in the scaling factor from 1 to 1 to 30 to 1:

|  | Mf. |
|---|---|
| Capacitor 10 | .01 |
| Capacitor 11 | .25 |
| Capacitor 25 | 2.00 |

In addition to the above, the value of capacitor 25 is important since the discharge of capacitor 11 must change the output of amplifier 24 a sufficient amount to cause the Schmitt trigger circuit 26 to reset to its original stable state. For example, if one assumes that the Schmitt trigger is initially actuated by a signal of −3 volts and reset when the signal drops to −2 volts, then a signal of −1.5 volts would insure the resetting of the Schmitt trigger. Accordingly, then $$V_1 = V_2 \frac{.25}{C_3}$$

and if $V_1 = 1.5$ volts and $V_2 = 10$ volts $C_3 = 2.5/1.5$ or 1.66 mf.

While the above invention has been described with relation to particular operations, it obviously can be used to supply an output frequency that bears a fixed relation to an input frequency regardless of the source of the input frequency. In addition, it is clear that the circuit can be used to not only multiply or divide the input frequency but also to accept a second variable for varying the output frequency in relation to both the input frequency and the second variable. Thus the circuits have the large utility of many types of operation. Accordingly, the invention should not be limited to the particular system described.

I claim as my invention:
1. A frequency multiplying circuit comprising:
  a capacitance bridge having first and second capacitors disposed to be charged and discharged in electrical opposition;
  a first source of voltage for charging said first capacitor and a second source of voltage for charging said second capacitor;
  an operational amplifier, said amplifier having a capacitor disposed in its feedback circuit;
  switch means conected to said first capacitor for alternately connecting said first capacitor to said first source of voltage and said amplifier, said first switch means being operated at the frequency to be multiplied;
  a second switch means connected to said second capacitor for alternately connecting said second capacitor to said second source of voltage and said amplifier;
  a trigger circuit, said amplifier being coupled to said trigger circuit;
  a pulse gate, said trigger circuit being coupled to said pulse gate to open the gate whenever the trigger circuit fires, a source of fixed frequency reference pulses coupled to said pulse gate, said pulse gate transmitting said fixed frequency reference pulses whenever the gate is opened;
  said pulse gate being coupled to said second switch means to operate the switch means in response to the reference pulses transmitted by said pulse gate whereby said reference pulses transmitted by the pulse gate are equal to the multiple of the frequency over a finite time interval.

2. A circuit for supplying an output frequency related to an input frequency by a real number, said circuit comprising:
  a capacitance bridge circuit having first and second capacitors, said first and second capacitors being disposed to be charged and discharged in electrical opposition;
  first and second voltage sources;
  an amplifier, said amplifier having a capacitor disposed in its feedback circuit;
  a first switch means, said first switch means being coupled to said first capacitor to alternately connect said first capacitor to said first voltage source and said amplifier, said first switch means being operated at said input frequency;
  a second switch means, said second switch means being coupled to said second capacitor to alternately connect said second capacitor to said second voltage source and said amplifier;
  a trigger circuit capable of changing from a non-conducting to a conducting condition when the input voltage reaches a predetermined level, said trigger circuit returning to a non-conducting condition when the input voltage drops below the predetermined level, said trigger circuit being coupled to said amplifier;
  said trigger circuit being coupled to said second switch means to operate said second switch means for each actuation of the trigger circuit whereby the frequency of operation of said trigger circuit is related to said input frequency by said real number.

3. The circuit of claim 2 wherein the trigger circuit is coupled to a monostable multivibrator circuit, said monostable multivibrator circuit being coupled to said second switch means.

4. The circuit of claim 3 wherein a pulse gate is disposed between the trigger circuit and the multivibrator and a source of fixed frequency pulses is coupled to the pulse gate.

5. The circuit of claim 2 wherein said first and second capacitors are of unequal sizes, said first capacitor being larger than said second capacitor.

6. The circuit of claim 2 wherein said second capacitor is larger than said first capacitor.

7. The circuit of claim 4 wherein a counter means is coupled to the pulse gate to count the number of fixed frequency pulses passed by said pulse gate.

References Cited

UNITED STATES PATENTS

| | | | |
|---|---|---|---|
| 2,977,536 | 3/1961 | Hindel | 324—79 |
| 3,163,751 | 12/1964 | Millsap et al. | |
| 3,169,233 | 2/1965 | Schwartz. | |
| 3,278,737 | 10/1966 | Germann | 235—196 |
| 3,345,503 | 10/1967 | Auer. | |

RUDOLPH V. ROLINEC, *Primary Examiner.*

P. F. WILLE, *Assistant Examiner.*

U.S. Cl. X.R.

235—196